(12) United States Patent
Hatfield

(10) Patent No.: US 7,442,739 B1
(45) Date of Patent: Oct. 28, 2008

(54) HOT MELT PRESSURE SENSITIVE ADHESIVES

(75) Inventor: Stephen F. Hatfield, Corinth, TX (US)

(73) Assignee: Henkel Corporation, Gulph Mills, PA (US)

( * ) Notice: Subject to any disclaimer, the term of this patent is extended or adjusted under 35 U.S.C. 154(b) by 465 days.

(21) Appl. No.: 10/990,728

(22) Filed: Nov. 17, 2004

Related U.S. Application Data

(63) Continuation-in-part of application No. 10/706,747, filed on Nov. 12, 2003, now abandoned.

(51) Int. Cl.
*C08K 5/01* (2006.01)
*C09J 191/00* (2006.01)

(52) U.S. Cl. .................. 524/474; 524/476

(58) Field of Classification Search ........... 524/474, 524/476
See application file for complete search history.

(56) References Cited

U.S. PATENT DOCUMENTS

| | | | | |
|---|---|---|---|---|
| 3,862,068 A | 1/1975 | Russell | | 524/271 |
| 4,299,475 A | 11/1981 | Nagahara | | 399/200 |
| 4,413,067 A | 11/1983 | Tsuchiya et al. | | 523/172 |
| 4,460,728 A | 7/1984 | Schmidt, Jr. et al. | | 524/271 |
| 4,526,577 A | 7/1985 | Schmidt, Jr. et al. | | 604/366 |
| 4,704,110 A | 11/1987 | Raykovitz et al. | | 604/366 |
| 4,944,933 A | 7/1990 | Inward | | 423/462 |
| 5,024,667 A | 6/1991 | Malcolm et al. | | 604/382 |
| 5,037,411 A | 8/1991 | Malcolm et al. | | 604/358 |
| 5,057,571 A | 10/1991 | Malcolm et al. | | 524/505 |
| 5,149,741 A | 9/1992 | Alper et al. | | 525/95 |
| 5,198,590 A | 3/1993 | Sofranko et al. | | 568/697 |
| 5,204,390 A | 4/1993 | Szymanski et al. | | 524/91 |
| 5,266,394 A | 11/1993 | Diehl et al. | | 442/398 |
| 5,523,343 A | 6/1996 | Giordano et al. | | 524/505 |
| 5,559,165 A * | 9/1996 | Paul | | 523/111 |
| 5,663,228 A | 9/1997 | Sasaki et al. | | 524/271 |
| 5,750,623 A | 5/1998 | Diehl et al. | | 525/98 |
| 5,916,981 A | 6/1999 | Cifuentes et al. | | 525/477 |
| 6,162,859 A | 12/2000 | Lu et al. | | 524/505 |
| 6,184,285 B1 * | 2/2001 | Hatfield et al. | | 524/505 |
| 6,213,993 B1 | 4/2001 | Zacharias et al. | | 604/386 |
| 6,251,966 B1 * | 6/2001 | Fry et al. | | 523/109 |
| 6,299,966 B1 * | 10/2001 | Bonke et al. | | 428/173 |
| 6,332,974 B1 | 12/2001 | Wittenbrink et al. | | 208/18 |
| 6,336,820 B2 | 1/2002 | Hida | | 439/188 |
| 6,448,303 B1 * | 9/2002 | Paul | | 523/105 |
| 6,620,143 B1 * | 9/2003 | Zacharias et al. | | 604/385.03 |
| 6,716,527 B1 | 4/2004 | Czmok et al. | | 428/403 |
| 7,183,351 B2 * | 2/2007 | Auguste et al. | | 524/504 |
| 2003/0168165 A1 | 9/2003 | Hatfield | | 156/327 |
| 2003/0181575 A1 | 9/2003 | Schmidt et al. | | 524/515 |
| 2004/0014863 A1 | 1/2004 | Lorenz et al. | | 524/430 |
| 2004/0106723 A1 | 6/2004 | Yang et al. | | 524/570 |

FOREIGN PATENT DOCUMENTS

| | | |
|---|---|---|
| EP | 1 013 733 A1 | 6/2000 |
| EP | 0 753 037 B1 | 8/2000 |
| EP | 0 888 174 B1 | 10/2001 |
| WO | WO 00/23402 A1 | 4/2000 |
| WO | WO 01/27188 A1 | 4/2001 |
| WO | WO 02/49996 A1 | 6/2002 |
| WO | WO 03/087254 | * 10/2003 |

OTHER PUBLICATIONS

Technical Data Sheet TDS NB3060: Nexbase™ 3060, Apr. 2, 2002, by Fortum Oil and Gas, 1 page.
Technical Data Bulletin: Nexbase™ 3000, undated, by Fortum Oil and Gas, 8 pages.

* cited by examiner

*Primary Examiner*—Peter Szekely
(74) *Attorney, Agent, or Firm*—Woodcock Washburn LLP

(57) ABSTRACT

The instant invention concerns hot melt pressure sensitive adhesives which comprise about 10 to about 50% by weight of at least one polymer; about 5 to about 50% of isoparaffinic oil; and about 30 to about 65% by weight of at least one tackifying resin. The invention also concerns products that utilize such adhesives.

16 Claims, 1 Drawing Sheet

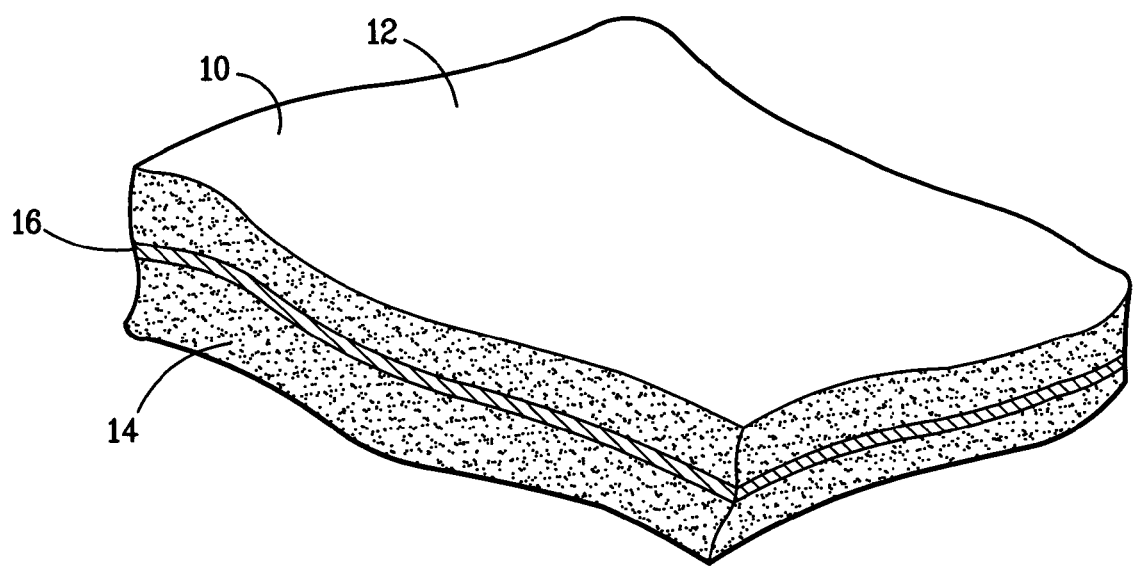

HOT MELT PRESSURE SENSITIVE ADHESIVES

CROSS-REFERENCE TO RELATED APPLICATIONS

This application is a continuation in part of U.S. patent application Ser. No. 10/706,747, filed Nov. 12, 2003, now abandoned, the disclosure of which is hereby incorporated by reference herein in its entirety.

FIELD OF THE INVENTION

This invention relates to new hot melt pressure sensitive adhesives and their use in laminates and articles of manufacture.

BACKGROUND OF THE INVENTION

Hot melt pressure sensitive adhesives (HMPSAs) have been used to bond a variety of materials to many substrates. A hot melt adhesive generally is a nearly water- and solvent-free adhesive which is applied on the substrate out of a molten state. The setting of the adhesive happens during the cooling down phase of the molten HMPSA, and retains high surface tackiness over time such that the HPMSA has a theoretically infinite open time. The bonding force of the HPMSA is derived from the ability of the adhesive to be compatible with the surface of both the substrate and the bonded materials. The adhesive bond arises from the compatibility of the adhesive mass with both the bonded material and the substrate and the internal cohesiveness of the adhesive mass.

Hot melt pressure-sensitive adhesives are widely used in the art. End uses include freezer tape, mailing tapes, peel and seal envelopes, outdoor labels, diapers, feminine sanitary napkins, adult incontinent products, medical gowns, and the like. The adhesive is applied to the article from a melt and are tacky at room temperature (or the temperature of desired use) for an extended period. These adhesives adhere essentially immediately to almost all substrates under light pressure. Although they can also be used for establishing bonds of large surface area after relatively long waiting times, the strengths of the resulting bonds are often very poor. Accordingly, they are mainly used when subsequent separation is required as is the case, for example, with adhesive plasters, labels, adhesive tapes, etc. To avoid unwanted bonding, the tacky surfaces have to be covered prior to use. One commonly used covering is silicone paper.

Hot melt pressure sensitive adhesives typically comprise a polymer, a tackifying resin and a plasticizing oil. The polymer provides flexibility, integrity and smooth peel adhesion properties. It also further provides a medium for dissolution or suspension of the tackifying resin and the plasticizing oil. The tackifying resin enhances tack properties and adhesion, and also reduces viscosity and the plasticizing oil reduces peel values, viscosities, glass transition temperatures and storage modulus (G'), and increases flexibility. The low ultimate peel value and lower peel adhesion of the removable adhesive is achieved through the use of higher polymer and plasticizing oil concentrations and lower tackifying resin concentrations in the adhesive. The low levels of tackifier and high polymer and oil concentrations can lead to several problems.

There are many requirements that must be met in the development of removable grade hot melt pressure sensitive adhesives including low viscosities at application temperatures of less than about 175° C., high heat resistance, good cold temperature flexibility, resistance to cold flow, good adhesion to the base substrate, high resistance to bleeding or staining of substrates, good die-cuttability and good quick tack or quick stick. The difficulty in formulating such adhesives is achieving a good balance of desirable properties without sacrificing one property to another. For instance, high heat resistance may be achieved at the expense of good cold temperature flexibility, lower viscosity may be achieved at the expense of stain resistance due to either higher levels of the liquid components or lower levels of polymer, good cold temperature flexibility may be achieved at the expense of resistance to what is known as "cold flow" at room temperature and adhesion and quick tack may be sacrificed to obtain lower, smoother peel characteristics to mention only a few examples.

Hot melt pressure sensitive adhesive formulations use a wide variety of thermoplastic elastomers (TPE's) including SIS, SBS, SEBS and SEPS where the S represents a styrene block, I is a polyisoprene block, B is a polybutadiene block, EB is an ethylene/butylene block and EP is a polyethylene/propylene block. Specific examples of hot melt pressure sensitive adhesives include ethylene-vinyl acetate (EVA) copolymer-based hot melts (U.S. Pat. No. 4,299,475), amorphous polypropylene-alpha-olefin (APAO)-based hot melts (U.S. Pat. No. 4,460,728), styrene-butadiene-styrene (SBS) A-B-A-B-A multi-block copolymer-based hot melts (U.S. Pat. No. 4,526,577), styrene-butadiene-styrene (SB)n radial copolymer-based hot melts (U.S. Pat. Nos. 4,944,933, 5,024,667, 5,037,411 and 5,057,571), and styrene-isoprene-styrene (SIS) A-B-A block copolymer-based hot melts (U.S. Pat. No. 5,149,741).

Although a broad state of the art for HMPSAs already exists, there is a need for such adhesives with improved properties. One area of need is for improved performance at low temperature. The present invention provides such an improvement.

SUMMARY OF THE INVENTION

In one embodiment, the invention is directed to a hot melt pressure sensitive adhesive (HMPSA) comprising (a) about 10 to about 50% by weight of at least one polymer; (b) about 5 to about 50% of isoparaffinic oil; and (c) about 30 to about 65% by weight of at least one tackifying resin. The HMPSA may comprise up to about 2.0% by weight of at least one stabilizer. Additionally, the HMPSA may comprise up to about 10% by weight of at least one filler or wax.

In some embodiments, the isoparaffinic oil has a glass transition temperature at or below about −75° C. for amorphous components in said isoparaffinic oil.

In certain embodiments, the isoparaffinic oil has a glass transition temperature is at or below about −80° C. for amorphous components in said isoparaffinic oil.

In some compositions, the isoparaffinic oil has a weight average molecular weight of about 390 to about 470 Daltons as measured by gel permeation chromatography using external polyethylene standards as the reference for this Mw determination.

In yet other compositions, a carbon-13 nmr spectra of the isoparaffinic oil shows substantially all aliphatic carbon atoms.

The HMPSAs of the instant invention may also comprise at least one additional plasticizer oil. In some embodiments, the additional oil is a naphthenic oil, a paraffinic oil, a phthalate or adipate ester, an oligomer of polypropylene, a polybutene, a polyisoprene, a hydrogenated polyisoprene or polybutadiene, a benzoate ester, a vegetable oil or animal oil.

In certain embodiments, the HMPSAs of the instant invention contain at least one wax. In some embodiments, the wax is a paraffin wax, a microcrystalline wax, a Fischer-Tropsch wax, a polyethylene wax, an ethylene vinyl acetate wax, an oxidized polyethylene wax, a hydrogenated castor oil wax, or mixtures thereof.

In certain preferred embodiments of the invention, the isoparaffinic oil has at least one of the properties: a Cp value (paraffinic carbon content) of greater than about 75%, a flash point of greater than 240° C., and a pour point of less than about −15° C.

In other embodiments, the isoparaffinic oil has a Chemical Abstracts number of 72623-87-1.

In some embodiments, the tackifying resin comprises at least one of aliphatic petroleum resins or the hydrogenated derivatives thereof, aromatic petroleum resins or the hydrogenated derivatives thereof, aliphatic/aromatic petroleum resins or the hydrogenated derivatives thereof, hydrocarbon resins, styrene resins, alpha-methyl styrene resins, polyterpene resins, copolymers and terpolymers of natural terpene resins, pentaerythritol esters of wood, gum, and tall-oil rosins, glycerol esters of wood, gum, and tall-oil rosins, or mixed esters of rosins.

Certain embodiments of the invention also contain at least one antioxidant. In some embodiments, this antioxidant is a hindered phenol or a phosphite.

In some aspects the invention is a hot melt construction adhesive comprising: (a) about 5 to about 20% by weight of a linear styrene-butadiene A-B-A-B-A multi-block copolymer containing at least about 25 weight percent styrene; (b) about 5 to about 20% by weight of a linear styrene-isoprene A-B-A tri-block copolymer containing at least about 25% by weight of styrene; (c) about 40 to about 65% by weight of at least one tackifying resin; (d) about 10 to about 30% by weight of isoparaffinic oil; (e) up to about 10% by weight of at least one wax; and (f) up to about 2.0% by weight of at least one stabilizer; where the adhesive has a viscosity no greater than about 6,000 mPa·s at about 140° C., a shear adhesion failure temperature of at least about 65° C., and a static shear time to failure of no less than about 25 hours at about 23° C.

The invention is also directed to laminated objects and articles of manufacture that include the adhesives described herein.

BRIEF DESCRIPTION OF THE DRAWINGS

FIG. 1 is a laminated article.

DETAILED DESCRIPTION OF ILLUSTRATIVE EMBODIMENTS

The instant invention is directed to hot melt pressure sensitive adhesives that exhibit superior bonding strengths at both high and low temperatures. These adhesives comprise a polymer component, a tackifier component and at least one isoparaffinic oil. In certain embodiments, another plasticizer is used in combination with the isoparaffinic oil. The polymer component comprises at least one block copolymer in certain preferred embodiments.

Plasticizers which are utilized in the hot melt adhesive of the present invention provide viscosity control and wetting and specific adhesion to bonded substrates. In a preferred embodiment, at least one isoparaffinic oil is used as a plasticizer in the composition. In certain preferred compositions, the isoparaffinic oil has a Cp value of greater than or equal to 75%. Cp (paraffinic carbon content) can be determined by Carbon 13 NMR or mass spectroscopy analysis. In other compositions, the isoparaffinic oil has a flash point of greater than or equal to 220° C., in some embodiments, greater than or equal to 240° C. Flash point can be determined by ASTM D-92. In yet other compositions, the isoparaffinic oil has a pour point of less than or equal to −12° C., in some embodiments, less than or equal to −15° C. Pour point can be determined by ASTM D-97.

Particularly suitable oils are marketed under the name Nexbase® by Fortum Oil and Gas. Fortum NEXBASE® 3000 oils are colorless oils that are catalytically hydroisomerized and dewaxed base oils of hydrogenated, highly isoparaffinic hydrocarbons. Isoparaffinic oils and their production are disclosed in U.S. Pat. Nos. 6,332,974; 6,336,820; and 5,198,590; PCT Patent Applications WO 02/49996 and WO 00/23402; and European Patent Applications EP0888174, and EP0753037. The disclosure of each of these patents and applications is incorporated herein by reference in its entirety.

Groups I, II, III, IV and V are broad categories of base oil stocks developed and defined by the American Petroleum Institute (API Publication 1509; www.API.org) to create guidelines for lubricant base oils. Group I base stock generally have a viscosity index of between about 80 to 120 and contains greater than about 0.03% sulfur and/or less than about 90% saturates. Group II base stocks generally have a viscosity index of between about 80 to 120, and contain less than or equal to about 0.03% sulfur and greater than or equal to about 90% saturates. Group III stock generally has a viscosity index greater than about 120 and contain less than or equal to about 0.03% sulfur and greater than about 90% saturates. Group IV includes polyalphaolefins (POA). Group V base stock includes base stocks not included in Groups I-IV. In certain preferred embodiments, the isoparaffinic oils used in the instant invention are classified as Group II base oils.

The following table compares properties of an isoparaffinic oil with technical white oil and a hydro-treated heavy naphthenic oil.

TABLE 1

Comparison of Oil Properties

| Type | Technical White Oil | Hydro-Treated Heavy Naphthenic Oil | Isoparaffinic Oil |
|---|---|---|---|
| Name | Pioneer T0352 | Nyflex 222B | Nexbase 3060 |
| Supplier | Esso | Nynas | Fortum |
| Composition: | | | |
| Ca | 1 | <1.0 | 0 |
| Cn | 33 | 42 | 20 |
| Cp | 66 | 57 | 80 |
| CAS # | 8042-47-5 | 64742-52-5 | 72623-87-1 |
| Flash Point | 240 | 210 | 240 |
| Pour Point | −12 | −18 | −15 |
| Density | 0.872 | 0.893 | 0.838 |
| US FDA 178.362 | B | B | B |
| Viscosity cSt at 40° C. | 71 | 100 | 33 |

Isoparaffinic oils show advantages versus technical white oils and hydro-treated heavy naphthenic oils in the instant invention. Thus, in certain embodiments, the instant invention uses an oil with a Cn (naphthenic carbon content) of less than 33, a Cp of greater than 75, and a viscosity (cSt at 40° C.) of less than 71. Cn can be measured by carbon-13 NMR or GC-Mass Spectroscopy. Viscosity can be measured by ASTM D-445. Ca (aromatic carbon content) can be determined by carbon-13 NMR or GC-Mass Spectroscopy. Density can be determined by ASTM D4052. US FDA 178.362(b) defines the requirements for fulfilling the demands for a technical white oil, such as Soybolt color at least +20 (ASTM D156-82) and maximum absorbency limits according to ASTM D-2269. These limits can be found in the table in CFR 21 178.362.

The following table compares the typical properties of various Nexbase® oils.

TABLE 2

Comparison of Nexbase® Oil Properties.

| Property | Nexbase 3020 | Nexbase 3030 | Nexbase 3043 | Nexbase 3060 | Nexbase 3080 |
|---|---|---|---|---|---|
| Viscosity (cSt) 100° C. | 2.2 | 3.0 | 4.3 | 6.0 | 8 |
| Viscosity Index | — | 111 | 124 | 128 | 128 |
| Pour Point (° C.) | −48 | −30 | −18 | −15 | −15 |
| Flash Point (° C.) | 164 | 198 | 224 | 240 | 260 |

In some embodiments, preferred isoparaffinic oils of the instant invention show gas chromatic peaks in the range from about $C_{22}$ to $C_{50}$ with a maxima at about $C_{26}$ to $C_{32}$-alkane when performed in an octane solution of 1% on a high temperature capillary column gas-chromotograghy unit. These isoparaffinic oils show a broader Mw than conventional oils.

In certain embodiments, preferred isoparaffinic oils of the instant invention have a Mw of less than or equal to about 470 Daltons. In certain embodiments, the preferred range is about 390-470 Daltons. In yet other embodiments, the preferred range is 402-467 Daltons.

In yet other embodiments, preferred isoparaffinic oils of the instant invention show a glass transition temperature of amorphous components is about −75° C. or below. In some embodiments, the glass transition temperature is −80° C. or below. In yet other compositions, the glass transition temperature is −86° C. for the amorphous components and glass transitions of about −67° C. and about −7° C. for crystalline subcomponents.

In some compositions, a carbon-13 nm r spectra of the isoparaffinic oil shows substantially all aliphatic carbon atoms. In certain embodiments, the carbon-13 nm r spectra shows greater than 95 molar percent aliphatic carbon atoms.

In still other embodiments, preferred isoparaffinic oils of the instant invention show a start of evaporation in an open Al-crucible under $N_2$ atmosphere of greater than 280° C., greater than 290° C. in some embodiments, and about 294° C. in certain other embodiments.

The compositions of the instant invention offer several advantages over analogous compositions using technical grade white oils. These advantages include better low temperature properties, making the product of the invention particularly suitable for use in freezer adhesion and peel and seal envelope applications. The compositions also show improved compatibility with SIS components. This compatibility leads to better stain resistance. The instant adhesives also provide lower peel values and more stable peel resistance.

The polymer can be any polymer that provides suitable properties. Many such polymers, known to one skilled in the art, can be used in this invention. Some of these polymers were discussed above in the background section of this application. Thermoplastic polymers, including thermoplastic elastomers, are particularly preferred for use in certain embodiments. Illustrative examples of suitable materials are styrene-butadiene rubber (SBR), styrene-butadiene-styrene block copolymer (SBS), styrene-butadiene block copolymer (SB), hydrogenated styrene-butadiene-styrene block copolymer (SEBS), styrene-isoprene-styrene block copolymer (SIS), styrene-isoprene block copolymer (SI), hydrogenated styrene-isoprene-styrene block copolymer (SEPS), and hydrogenated styrene-isoprene block copolymer (SEP). Terpolymers are suitable materials for the instant invention. One such terpolymer, marketed by the Kraton Polymer Group, is "Tacky G". This terpolymer is a SEBS block copolymer which has a grafted SI diblock on the backbone. Another suitable materials are copolymers of ethylene and vinyl acetate (EVA). Yet other suitable polymers include (meth) acrylate polymers such as ethylene/(meth)acrylic acid (EMA), ethylene/acrylic acid (EAA), and ethylene/n-butyl acrylate (EnBA). Polyethylenes (including metallocene catalyzed), poly-alpha-olefins (including APAO and amorphous polypropylene (PP)) can also be used in the instant invention.

The hot melt pressure sensitive construction adhesive of the invention may contain, as one primary component, a blend of a styrene-butadiene block copolymer containing at least about 25 weight percent styrene and a styrene-isoprene block copolymer containing at least about 25 weight percent styrene. The styrene-butadiene block copolymer can broadly represent from about 5 to about 20, preferably from about 8 to about 16, weight percent of the hot melt adhesive of this invention. The styrene-isoprene block copolymer can broadly represent from about 5 to about 20, preferably from about 8 to about 16, weight percent of the hot melt adhesive of this invention. The styrene-butadiene and styrene-isoprene block copolymers can be linear copolymers corresponding to the general configuration A-B-A or A-B-A-B-A or radial copolymers corresponding to the general configuration $(AB-)_n$ wherein the polymer blocks A are non-elastomeric styrene-containing polymer blocks, and the polymer blocks B are elastomeric butadiene-containing or isoprene-containing polymer blocks. The use of linear styrene-butadiene block copolymers is particularly preferred for use herein. The styrene-butadiene block copolymer and styrene-isoprene block copolymer are individually comprised of at least about 25 weight percent, preferably from about 25 to about 50, and more preferably from about 35 to about 45, weight percent styrene. The styrene-butadiene block copolymer and the styrene-isoprene block copolymer each individually possess a melt flow index of from about 3 to about 50, preferably from about 8 to about 40 (as determined by ASTM-D 1238-95). The ratio of butadiene-isoprene block copolymer to styrene-isoprene block copolymer employed to produce the physical blend can broadly range from about 1:3 to about 3:1 parts by weight and preferably is about 1:1.

Typical styrene-butadiene copolymers which can be advantageously employed in the present invention include the linear A-B-A triblock styrene-butadiene copolymers sold under the trade names Kraton D-1102 by the Kraton Polymer Group or SolT166 by Polimera Europa, the linear A-B-A-B-A multiblock styrene-butadiene block copolymers sold under the trade names Stereon 840A by Firestone or Vector D-4461 by Dexco and the radial $(AB-)_n$ styrene butadiene copolymers sold under the trade name Kraton D-1122X by the Kraton Polymer Group or SolT168 by Polimera Europa. Typical styrene-isoprene copolymers which can advantageously be employed herein are the styrene-isoprene copolymers sold under the trade names Vector 4411D by Dexco or SolT193A, SolT193B and SolTE-9308 by Polimera Europa. In addition to high styrene content, the di-block content of the styrene-isoprene copolymers is advantageously maintained below 25 weight percent, more preferably below 10 weight percent and most preferably 0 weight percent due to their poor thermal stability (which leads to di-block formation and a loss of creep and heat resistance).

In some embodiments it is preferred to use one or both of a linear A-B-A-B-A multiblock styrene-butadiene block copolymer (such as that sold by Firestone under the trade name Stereon 840A) and a linear A-B-A triblock styrene-isoprene copolymer (such as the one having essentially no di-block content sold by Dexco under the trade name Vector 4411D).

The tackifying resin(s) which are employed in the hot melt construction adhesives of the present invention are those which extend the adhesive properties and improve specific adhesion characteristics of the adhesives. As used herein, the term "tackifying resin" includes, but is not limited to, natural and modified rosins such as gum rosin, wood rosin, tall-oil rosin, distilled rosin, hydrogenated rosin, dimerized rosin and polymerized rosin; glycerol and pentaerythritol esters of natural and modified rosins, such as the glycerol esters of pale wood rosin, hydrogenated rosin, polymerized rosin and the pentaerythritol ester of pale wood rosin, hydrogenated rosin, tall oil rosin and the phenolic-modified pentaerythritol ester of rosin; polyterpene resins having a softening point, as determined by ASTM method E28-58T, of from about 60° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins; copolymers and terpolymers of natural terpenes, e.g., styrene/terpene, a-methyl styrene/terpene and vinyl toluene/terpene; phenolic-modified terpene resins such as, for example, the resin product resulting from the condensation, in an acidic medium, of a terpene and a phenol; aliphatic petroleum hydrocarbon resins having Ball and Ring softening points of from about 60° C. to 140° C., the latter resins resulting from the polymerization of monomers consisting primarily of olefins and diolefins; also included are the hydrogenated aliphatic petroleum hydrocarbon resins; aromatic petroleum hydrocarbons and the hydrogenated derivatives thereof, aliphatic-/aromatic petroleum derived hydrocarbons and the hydrogenated derivatives thereof. Mixtures of two or more of the above described tackifying resins can be employed where desired. Tackifying resins can broadly represent from about 40 to about 65 parts by weight of the hot melt adhesive of this invention and preferably represent from about 50 to 60 parts by weight of the hot melt adhesive of this invention.

The preferred tackifying resins for the present invention are aliphatic/aromatic petroleum derived hydrocarbon resins having softening points from about 60° C. to about 130° C. Commercially available resins of this type are supplied by Exxon under the trade name Escorez 5600 and by Eastman Chemical under the trade name Regalite V 1100. These resins offer excellent compatibility with blends of styrene-isoprene and styrene-butadiene block copolymers without the need of co-tackifying resins. Their light color and low odor make them ideal for consumer article construction applications. These resins have softening points from about 90° C. to about 110° C.

Additional plasticizers may be used in the instant compositions. These plasticizers are selected from a group consisting of naphthenic oil, phthalate and adipate esters, oligomers of polypropylene, polybutenes, polyisoprene, hydrogenated polyisoprene and polybutadiene, benzoate esters, and vegetable and animal oils and derivatives thereof and mixtures of two or more of any of the foregoing. One such plasticizer is a paraffinic oil such as a commercial grade available from Witco under the trade name Kaydol oil. Plasticizers can broadly represent from about 5 to about 50% by weight of the hot melt adhesive of this invention. In some embodiments, the amount of plasticizer is preferably from about 10 to about 40% by weight of the hot melt adhesive. In other embodiments, the amount of plasticizer is preferably from about 10 to about 30% by weight of the hot melt adhesive. In still other embodiments, the plasticizer represents from about 15 to about 25% by weight of the hot melt adhesive of this invention.

Waxes in the composition of the present invention ranging from 0% to 10% by weight may be used to reduce the surface tack of the adhesives without appreciably decreasing their adhesive bonding characteristics. These waxes also are used to reduce the blocking of the composition without affecting the temperature performance. Among the useful waxes are low molecular weight, that is, 1000-6000, polyethylene having a hardness value, as determined by ASTM method D-1321 of from about 0.1 to 120 and ASTM softening points of from about 65° C. to 120° C. Also, petroleum waxes may be used such as paraffin wax having a melting point of from about 55° C. to 75° C. and microcrystalline wax having a melting point of from about 55° C. to 95° C., the latter melting points being determined by ASTM method D 127-60. Atactic polypropylenes are also suitable they have a ring and ball softening point of from about 120° C. to 160° C. Another group of waxes are synthetic waxes made by polymerizing carbon monoxide and hydrogen such as Fischer-Tropsch wax; and polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred for use in the compositions of the present invention have a Ring and Ball softening point of 95° C. to 175° C. As should be understood, each of these wax diluents is solid at room temperature. Other useful substances include hydrogenated animal, fish and vegetable fats and oils such as hydrogenated tallow, lard, soya oil, cottonseed oil, castor oil, menhadin oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

Preferred waxes may be selected from a group comprised of paraffin wax, microcrystalline wax, Fischer-Tropsch wax, polyethylene wax, ethylene vinyl acetate wax, oxidized polyethylene wax, hydrogenated castor oil and derivatives thereof, polypropylene wax and mixtures of two or more of any of the foregoing. Some preferred waxes for the present invention are selected from a group of oxidized polyethylene waxes, of which a commercial grade is available from Honeywell under the trade name AC-395. Wax component(s) can represent from 0 to about 10 parts by weight of the hot melt adhesive of this invention and preferably represent from about 3 to about 7 parts by weight of the hot melt adhesive of this invention.

Stabilizers or antioxidants can be optionally utilized in the present invention, such as high molecular weight hindered phenols and multifunctional phenols. Hindered phenols are well known to those skilled in the art to be effective primary stabilizers for both styrene-isoprene block copolymers and styrene-butadiene block copolymers. Typical commercially available stabilizers of these types are supplied by Ciba-Geigy under the trade names Irganox 1010 and Irganox 1076. Useful secondary stabilizers also include phosphites, such as tris-(p-nonylphenyl)-phosphite (TNPP) and bis(2,4-di-tertbutylphenyl)4,4'-diphenylene-diphosphonite and di-stearyl-3,3'-thiodipropionate (DSTDP). Stabilizer(s) can represent from 0 to about 2.0 percent by weight of the hot melt adhesive of the present invention. In some embodiments, the stabilizer is preferably present in an amount from about 0.01 to about 2.0 percent by weight of the hot melt adhesive of this invention. In other embodiments, the stabilizer is preferably present in an amount from about 0.25 to about 1.5 percent by weight of the hot melt adhesive of this invention.

The hot melt pressure sensitive adhesive of the instant invention may also contain filler or other materials that do not adversely affect the properties of the adhesive. These properties include removeability, nonstaining, and the adhesive character of the product.

In some aspects the invention is a hot melt construction adhesive comprising: (a) about 5 to about 20% by weight of a linear styrene-butadiene A-B-A-B-A multi-block copolymer containing at least about 25% by weight styrene; (b) about 5 to about 20% by weight of a linear styrene-isoprene A-B-A tri-block copolymer containing at least about 25 weight percent styrene; (c) about 40 to about 65% by weight of at least one tackifying resin; (d) about 10 to about 30% by weight of isoparaffinic oil; (e) up to about 10% by weight of at least one wax; and (f) up to about 2.0% by weight of at least one stabilizer; where the adhesive has a viscosity no greater than about 6,000 mPa·s at about 140° C., a shear adhesion failure temperature of at least about 65° C., and a static shear time to failure of no less than about 25 hours at about 23° C.

The invention also concerns laminated object comprising a plurality of superposed layers, at least one of said layers being adhered together with a hot melt pressure sensitive adhesive comprising: (a) about 10 to about 50% by weight of at least one polymer; (b) about 5 to about 50% by weight of isoparaffinic oil; and (c) about 30 to about 65% by weight of at least one tackifying resin.

An illustrative embodiment is presented in FIG. 1. In this FIGURE, the laminated object 10 comprises two layers (12 and 14) that are adhered together by a hot melt adhesive 16.

In an other embodiment, the invention relates to an article of manufacture comprising a plurality of components, at least two of said components being adhered together with a hot melt pressure sensitive adhesive comprising: (a) about 10 to about 50% by weight by weight of at least one polymer; (b) about 5 to about 50% by weight of isoparaffinic oil; and (c) about 30 to about 65% by weight by weight of at least one tackifying resin. In some embodiments, the article of manufacture is suitable for use at low temperature and said adhesive comprises: a) 10 to 35% by weight of at least one polymer, said polymer being at least one of SIS, SI, SBS, SB, SBR, SEP, SEPS, SEBS, terpolymer, EVA, EMA, EAA, or EnBA; b) 15 to 30% by weight of at least one oil, said oil comprising at least an isoparaffinic oil; c) 40 to 60% by weight of at least one tackifying resin; d) up to 1.0% by weight of at least one stabilizer, said stabilizer being other than a TNPP stabilizer; and e) up to 3.0% by weight of a wax.

The invention is also directed to sanitary pads or panty liners that utilize a hot melt pressure sensitive adhesive comprising (a) 10 to 30% by weight of at least one polymer, said polymer being at least one of SIS, SI, SBS, SB, SBR, SEP, SEPS, SEBS or terpolymer; (b) 15 to 30% by weight of at least one oil, said oil comprising at least an isoparaffinic oil; (c) 35 to 55% by weight of at least one tackifying resin; (d) up to 1.0% by weight of at least one stabilizer, said stabilizer being other than a tris-(p-nonylphenyl)-phosphite (TNPP) stabilizer; and (e) up to 3.0% by weight of one or more of wax or pigment.

In other aspects the invention is directed to an adhesive useful in the preparation of freezer tapes or low temperature labels, the adhesive comprising (a) 10 to 35% by weight of at least one polymer, said polymer being at least one of SIS, SI, SBS, SB, SBR, SEP, SEPS, SEBS, terpolymer, EVA, EMA, EAA or EnBA; (b) 15 to 30% by weight of at least one oil, said oil comprising at least an isoparaffinic oil; (c) 40 to 60% by weight of at least one tackifying resin; (d) up to 1.0% by weight of at least one stabilizer, said stabilizer being other than a TNPP stabilizer; and (e) up to 3.0% by weight of a wax.

The instant invention is also directed to an adhesive useful for affixing labels to PET bottles, glass bottles, glass jars, and polyolefin, polycarbonate, or polystyrene containers, said adhesive comprising: (a) 10 to 25% by weight of at least one polymer, said polymer being at least one of SIS, SI, SBS, SB, SBR, SEP, SEPS, SEBS, terpolymer, EVA, EMA, EAA or EnBA; (b) 20 to 35% by weight of at least one oil, said oil comprising at least an isoparaffinic oil; (c) 40 to 60% by weight of at least one tackifying resin; (d) up to 2.0% 0 to 1.0% by weight of at least one stabilizer, said stabilizer being other than a TNPP stabilizer; and (e) up to 3.0% by weight of one or more of wax or pigment.

In some aspects, the invention relates to an adhesive useful in the construction of a self sealing mailer (such poly-bags or envelopes including Peel-N-Seal corrugated mailers for example), paper envelope, polybag or bank depository bag or envelopes, requiring low temperature tamper resistance to −55 C., wherein said adhesive comprises 18 to 35% by weight of at least one polymer, said polymer being at least one of SIS, SI, SBS, SB, SBR, SEP, SEPS, SEBS, terpolymer, EVA, EMA, EAA or EnBA; 10 to 30% by weight of at least one oil, said oil comprising at least an isoparaffinic oil; 30 to 55% by weight of at least one tackifying resin; up to 2.0% by weight of at least one stabilizer, said stabilizer being other than a TNPP stabilizer; and up to 3.0% by weight of one or more of wax or pigment.

In other aspects, the invention concerns an adhesive useful in attaching a headliners, fixing shoddy and carpet, and the manufacture of mechanical assists and structural assists, wherein said adhesive comprises 35 to 55% by weight of at least one polymer, said polymer being at least one of SIS, SI, SBS, SB, SBR, SEP, SEPS, SEBS, terpolymer, EVA, EMA, EAA or EnBA; 3 to 15% by weight of at least one oil, said oil comprising at least an isoparaffinic oil; 40 to 60% by weight of at least one tackifying resin; up to 2.0% by weight of at least one stabilizer, said stabilizer being other than a TNPP stabilizer; and up to 10.0% by weight of one or more of wax or pigment.

Certain embodiments relate to an adhesive useful in the preparation of insert or onsert advertisement or a sample capable of being removed and repositioned in a magazine or a newspaper, a credit card attachment for mailers, or a repositionable paper or film labels for paper or stationary products, wherein and said adhesive comprises 20 to 40% by weight of at least one polymer, said polymer being at least one of SIS, SI, SBS, SB, SBR, SEP, SEPS, SEBS, terpolymer, EVA, EMA, EAA or EnBA, 30 to 55% by weight of at least one oil, said oil comprising at least an isoparaffinic oil, up to 40% by weight of at least one tackifying resin, wherein said tackifying resin has a RBSP value greater than or equal to 80° C., up to 1.0% by weight of at least one stabilizer, said stabilizer being other than a TNPP stabilizer; and up to 5.0% by weight of a wax.

Yet other embodiments of the invention relate to an adhesive useful for manufacturing a UV resistant clear tape, decal or label, wherein said adhesive comprises 20 to 40% by weight of at least one polymer, said polymer being at least one of SIS, SI, SEP, SEPS, SEBS or terpolymer; 10 to 25% by weight of at least one oil, said oil comprising at least an isoparaffinic oil; 40 to 60% by weight of at least one fully hydrogenated tackifying resin; up to 2.0% by weight of at least one stabilizer, said stabilizer being other than a TNPP stabilizer; and up to 3.0% by weight of one or more of wax or pigment.

In some embodiments, the adhesive comprises 20 to 60% by weight of at least one amorphous PP, APAO, PE, or metallocene-catalyzed PE; 20 to 50% by weight of at least one tackifying resin; 5 to 30% by weight of at least one oil, said oil comprising at least an isoparaffinic oil; up to 2% by weight of at least one stabilizer, said stabilizer being other than TNPP; and up to 20% by weight of one or more of wax or filler.

The invention is also directed to adult incontinent products and medical gowns comprising the adhesives described herein. One skilled in the art will recognize other uses for the adhesives of the instant invention.

Proper manufacturing procedures of the adhesive are required to assure product consistency. In some instances, these procedures may include mixing of the components of the adhesive under vacuum to remove air, which can cause oxidation and a loss of physical properties. Breaking the vacuum with nitrogen or carbon dioxide gas to prevent oxygen entrapment in the adhesive is also desirable. Using a minimum amount of thermal and mechanical energy to manufacture the adhesive and cooling the finished adhesive quickly to prevent degradation are additional useful procedures to employ. The hot melt pressure sensitive adhesive of this invention may be prepared by mixing the components in a heated tank under vacuum at a temperature of from about 120° C. to about 190° C. until a homogeneous blend is obtained. Minimal amounts of thermal and mechanical energy should be employed to manufacture the adhesive. The determination of such amounts are well within the experience of one skilled in the art. This step usually requires two to three hours. The vacuum is then broken with nitrogen or carbon dioxide gas to prevent air entrapment in the adhesive. The finished adhesive is then packed and cooled for shipment to the manufacturer of the disposable articles.

The disposable article manufacturer then may re-melt the hot melt adhesive for use as the construction adhesives of the article of manufacture. The application of the hot melt construction adhesives may be accomplished by several applications systems depending on the type of article being made and the substrates involved. These application systems may involve spiral spray techniques, multi-line extrusion, multi-dot extrusion, and melt blown deposition. The adhesives produced by the teachings of the present invention can be applied by any of the aforementioned techniques in the manufacture of consumer articles, and wherein the adhesive is bonding a polyolefin or nonwoven substrate to at least one elastic, polyolefin, foam, or nonwoven substrate.

The invention also concerns a process of bonding together of two surfaces. A coating of the hotmelt adhesive of the instant invention is applied as a melt to coat each surface to be joined and permitting the applied contact hotmelt adhesive to solidify. Bonding of the two surfaces is achieved by fitting the coated surfaces together with pressure. In some preferred embodiments, it is not necessary to apply heat to achieve surface bonding.

It is desirable for the products using the instant adhesive have sufficient adhesion to bind securely to the surface to which they are attached. It is also important that such products can be removed from the surface without excessive effort. Tan Delta (Tan δ) is one measure of this property. For further discussion of this Theological property, see, for example, U.S. Pat. No. 6,213,993, the disclosure of which is incorporated herein in its entirety. The aforementioned reference provides Tan Delta ranges that are suitable for certain embodiments of the invention.

This invention can be further illustrated by the following examples of the preferred embodiments thereof, although it will be understood that these examples are included only for illustration and comparison to the existing art, and are not intended to limit the scope of the invention unless specifically indicated.

Test Methods

Method 1: Viscosity

This method is designed to determine the molten viscosity of hot melt adhesives at specified temperatures and is similar to ASTM-D 3236-88 The equipment used in these experiments is:

1) Viscometer—Brookfield RVT;

2) Spindles—Stainless Steel
   a. SC 4-21
   b. SC 4-27
   c. SC 4-28
   d. SC 4-29;

3) Sample chamber with a temperature controller that provides an accuracy of +/−1.0° C. or better through temperature range of at least 100° C. to 200° C.; and 4) Various Brookfield accessories (i.e. extracting tool, viscometer stand, ceramic chamber cover, etc.).

Sample preparation involves cutting the hot melt adhesive into strips small enough to fit into the sample chamber.

The following steps are used in the test procedure:

1) Preheat Thermo-cell to desired temperature,

2) Estimate approximate viscosity of sample,

3) Based on this estimate, select spindle from Table A,

4) Weigh out amount of sample indicated in Table A for the spindle,

5) Place sample in Thermo-cell chamber and allow to melt,

6) Insert spindle, lower viscometer into position, level Thermo-cell and viscometer then cover chamber, 7) Turn on motor and adjust speed to maintain reading between 20 and 80, 8) Monitor viscosity until Thermo-cell temperature equilibrates and reading stabilizes—approximately 20 minutes, 9) Record Spindle, Speed, Temperature and Viscometer readout, and 10) Calculate viscosity by multiplying readout by the spindle/speed factor from Table B.

The results from the test are reported in mPa·s at test temperature.

TABLE A

| Viscosity Range | (mPa · s) Spindle | Sample weight (grams) |
| --- | --- | --- |
| 0–5,000 | SC 4-21 | 8.0 |
| 5,000–10,000 | SC 4-27 | 10.5 |
| 10,000–60,000 | SC 4-28 | 11.0 |
| 60,000–100,000 | SC 4-29 | 13.0 |

TABLE B

| Speed (RPM) | SC 4-21 | SC 4-27 | SC 4-29 | SC 4-29 |
|---|---|---|---|---|
| 100 | 5 | 25 | 50 | 100 |
| 50 | 10 | 50 | 100 | 200 |
| 20 | 25 | 125 | 250 | 500 |
| 10 | 50 | 250 | 500 | 1K |
| 5 | 100 | 500 | 1K | 2K |
| 2.5 | 200 | 1K | 2K | 4K |
| 1 | 500 | 2.5K | 5KJ | 10K |
| 0.5 | 1K | 5K | 10K | 20K |

Test Procedure 2: Ring and Ball Softening Point (RBSP)

This method is designed to determine the softening point of hot melt adhesives and is similar to ASTM-E 28-67. The equipment used in these experiments is a ring and ball apparatus conforming to ASTM-E 28-67 FIG. 1(d) including:
 a. Ring,
 b. Ball—3.51 grams+/−0.02 grams,
 c. Ball-Centering guide,
 d. Thermometer—min. range of 40 to 200° C. in 1 degree increments,
 e. Container—1000 ml Pyrex beaker, and
 f. Support for ring and thermometer.

Sample preparation involves the steps:

1) Place two rings with shoulder side up on a suitable surface,

2) Pour molten adhesive into ring with a small amount of excess,

3) Allow the adhesive to cool before moving,

4) Condition samples at least 24 hours in standard conditions, and

5) Remove excess adhesive flush with ring.

The following steps are used in the test procedure:

1) Fill container with 700 ml of glycerin and add magnetic stirrer,

2) Place sample rings into position in support apparatus,

3) Place ring-centering apparatus over sample rings,

4) Place balls in center of rings,

5) Insert thermometer into support apparatus so that bottom of bulb is level with bottom of rings, 6) Submerge assembled apparatus in glycerin, 7) Heat glycerin at a rate of 5° C. per minute while stirring, 8) Record temperature at which the material touches the horizontal plate 2.54 cm below the sample rings, and 9) Take average of 2 samples.

The results from the test are reported in ° C.

Test Method 3: Shear Adhesion Failure Temperature (SAFT)

This method is designed to test the heat resistance of hot melt adhesives in shear mode and is similar to ASTM-D 4498-85. The equipment used in these experiments is:

1) 50 micron Mylar® polyester film,

2) Release paper, 3) 5 cm×7.5 cm stainless steel (SS) plates, 4) 5 cm×7.5 cm high density polyethylene (HDPE) plates, 5) Acumeter 5 cm laboratory coater, 6) Roll down device with 2 kg rollers, 7) 500 g weights, 8) Clamping devices for suspending the samples and weights in the oven, and 9) Forced ventilation oven with optional programmable controller.

Sample preparation involves:

1) Samples are coated onto 50 micron Mylar® film at 25 microns coat weight+/−3 microns and nipped with release paper, and 2) Test samples are conditioned for at least 24 hours in standard conditions.

The following steps are used in the test procedure:

1) Cut 2.5 cm×7.5 cm strips from the coated stock,

2) Clean panel three times. First wipe gross adhesive with a suitable solvent and a lint free towel (suitable solvents include toluene, n-heptane, methyl ethyl ketone (MEK)). Repeat cleaning with new towel and methanol. Then clean any residue with a clean towel and hexane, 3) Place one end of the strip on a panel so that 2.5 cm overlap. This should result in a 2.5 cm×2.5 cm bonded area, 4) Place sample in the roll down device and roll sample down the plate with one forward and one backward pass at 30 cm per minute, 5) Use 500 gram weights, 6) Set initial oven temperature to 32° C., 7) Hang three (3) samples from suitable clamps in the oven, 8) Place weights and weight clamps in the oven and allow all apparatus to equilibrate, 9) Hang weights onto samples so that a shear configuration is obtained, 10) For manual oven, increase temperature 5.5° C. within 2 minutes and then soak for 10 minutes and repeat until all samples fail, 11) For programmable oven, set ramp at 33.3° C./hour, and 12) Record temperature of each sample's failure.

The results from the test are reported as follows:

1) Report material of substrate panel, and

2) Report average of three samples in ° C.

Test Method 4: 180° Peel

This method is designed to test the adhesion of pressure sensitive adhesives to stainless steel (SS) panels or HDPE panels and is similar to PSTC and ASTM-D 3330. The equipment used in these experiments is:

1) Instron, model 1000, 2) 50 micron Mylar® film,

3) Release paper,

4) Acumeter 5 cm laboratory coater,

5) Roll down device with 2 kg rollers, 6) 5 cm×15 cm stainless steel panels, and 7) 5 cm×15 cm HDPE panels.

Sample preparation involves:

1) Samples shall be coated onto 50 micron Mylar® film at 25 micron coat weight+/−3 micron and nipped with release paper, 2) Test samples shall be 2.5 cm wide and approximately 20 cm long, and 3) Test samples shall be conditioned for at least 24 hours in standard conditions.

The following steps are used in the test procedure:

1) Clean panel three times. First wipe gross adhesive with a suitable solvent and a lint free towel (suitable solvents include toluene, n-heptane, methyl ethyl ketone (MEK)). Repeat cleaning with new towel and methanol. Then clean any residue with a clean towel and hexane, 2) Set up the Instron to track tension in the anticipated range and adjust to zero. Set crosshead speed to 30 cm/min. Set up chart recorder to appropriate range and adjust zero, 3) Remove release paper backing from one end of test strip and touch to one end of panel. Roll strip down to panel using only the weight of the roller and moving at a rate of 30 cm/min. At the same rate, roll the roller backward to the start and off, and 4) Test sample immediately—within one minute. Fold back the free end of the strip and peeling approximately 2.5 cm from the panel. Clamp that end of the panel to the lower jaw of the Instron. Clamp the free end of the test strip to the upper jaw. Start the upper jaw in motion. Disregard the values obtained from the first 2.5 cm of peel. Use the average force value obtained during the next 5 to 8 cm as the adhesion force.

The results from the test are reported as follows:

1) Report material of substrate panel, and

2) Report the peel adhesion force in pounds/linear inch (width).

Test Method 5: Loop Tack

This test is designed to test the tack (quick stick) of pressure sensitive adhesives to a SS plate. The equipment used in these experiments is:

1) 50 micron Mylar® film,

2) Release paper,

3) Acumeter 5 cm laboratory coater,

4) Roll down device with 2-kilogram rollers,

5) Stainless steel plates, and

6) Instron tensile tester.

Sample preparation involves the steps:

1) Samples are coated onto 50 micron Mylar® film at a 25 micron coat weight+/−3 microns and nipped with release paper, and 2) Test samples are 2.5 cm wide and approximately 12.5 cm long.

The following steps are used in the test procedure:

1) Clean panel three times. First wipe gross adhesive with a suitable solvent and a lint free towel (suitable solvents include toluene, n-heptane, and MEK). Repeat cleaning with a new towel and methanol. Then clean any residue with a clean towel and hexane, 2) Set up the Instron to tack tension in the anticipated range and adjust the zero. Set crosshead speed to 30 cm/min. Setup chart recorder to appropriate range and adjust zero, 3) Samples are placed into jaws of the Instron tensile tester and lowered at 12"/min onto a clean SS plate, contact area of 1 square inch and then sample is instantaneously pulled away at 30 cm/min, and 4) Five samples are tested and the average is reported.

The results from the test are reported as follows:

1) Report material of substrate panel, and

2) Report the peel adhesion force in pounds per linear inch (width).

Test Method 6: Adhesion Testing at −45° C.

This method is designed to evaluate an adhesive's relative adhesion to polyethylene (PE) and corrugated boxboard at low temperatures. The equipment used in these experiments is:

1) 50 micron Mylar® film,

2) Release paper, 3) 5 cm×12 cm pieces of PE film and corrugated boxboard,

4) Acumeter 5 cm laboratory coater,

5) Roll down device with 2-kilogram rollers, and

6) Refrigerated cabinet maintained at −45° C.

Sample preparation involves the steps:

1) Samples are coated onto 50 micron Mylar(film at 25 micron coating thickness+/−3 microns and nipped with release paper, and 2) Test samples are conditioned for at least 24 hours at standard conditions.

The following steps are used in the test procedure:

1) Cut 2.5×20 cm strips from coated stock,

2) Remove release paper backing from one end of the test strip and touch to one end of the PE film or corrugated boxboard. Roll strip down the sample using only the weight of the roller and moving at a rate of 30 cm/min. At the same rate, roll the roller backward to the starting position and remove the sample, 3) Condition the test samples for one hour after roll down at standard conditions, 4) Place test samples in refrigerated cabinet at −45° C. for 16 hours, 5) After the 16 hour exposure to 45° C., slowly peel each sample while it is in the cabinet to check for adhesion to the PE film and/or corrugated boxboard, and 6) Test three specimens of each sample and report the average result.

The results from the test are reported as follows:

1) Report the substrate material, and

2) Report the relative degree of adhesion to the substrate by one of the labels listed in order of adhesion, "excellent" (the best), "very good", "good", "fair", and "poor" (the worst with little or no adhesion). For corrugated boxboard report the percentage of fiber tear (FT).

Test Method 7: Staining Testing at 65° C.

This method is designed to evaluate an adhesive's resistance to staining paper at high storage temperatures. The equipment used in these experiments is:

1) 50 micron Mylar film,

2) Release paper,

3) Standard 20 pound acid free, 84 brightness copier paper,

4) Accumeter 5 cm laboratory coater,

5) Roll down device with 2-kilogram rollers, and

6) Convection oven maintained at 65° C.

Sample preparation involves the steps:

1) Samples are coated onto 50 micron Mylar® film at 25 microns coating thickness+/−3 microns and nipped with release paper, and 2) Test samples are conditioned for at least 24 hours at standard conditions.

The following steps are used in the test procedure:

1) Cut 2.5×20 cm strips from coated stock,

2) Remove release paper backing from one end of the test strip and touch to one end of standard copy paper (note: up to six samples can be tested on one sheet of paper). Roll strip down the sample using only the weight of the roller and moving at a rate of 30 cm/min. At the same rate, roll the roller backward to the starting position and remove the sample, 3) Condition the test samples for one hour after roll down at standard conditions, 4) Place test samples in an oven at 65° C. for 7 days, 5) After the 7 day exposure to 65° C., check the underside of the paper for staining, and 6) Test three specimens of each sample and report the average result.

The results from the test are reported as follows: excellent (best), very good, good, fair, and poor (worst, severe staining).

Test Method 8: Rheological Determination of Tg, G' (Storage Modulus), Peak Tan Delta and Flow Point This method is designed to measure a HMPSA's stress response to a constant strain of $4.0 \times 10^{-4}$ Pa at a fixed frequency of 1.6 Hertz over a temperature ramp of 5° C. per minute from −50° C. to 115° C. Important data on the HMPSA's physical state at different temperatures can be derived from the resulting data. This data includes glass transition (Tg) which is the temperature at which the product becomes a glassy solid. Other data includes G' which is a measure of the stiffness or softness of the HMPSA or storage modulus at different temperatures, G" which is the viscous component of the adhesive (a measure of wettability) or loss modulus, and the Tan Delta or ratio of loss to storage modulus, which can help predict tackiness and flow point of the adhesive (an indicator of heat resistance. The equipment used in these experiments is:

1) Reologica StessTech parallel plate rheomoeter (sold by ATS), with liquid $N_2$ refrigeration unit capable of −50° C. and programmable heating rate of 5° C. per minute to 115° C., 2) Silicone mold for sample preparation, 3) A 150° C. oven for melting samples, and 4) Teflon® tool for removing excess adhesive from the plates.

Sample preparation and test procedure involves the steps:

1) The sample to be measured is heated to 150° C.,

2) The molten sample is poured into a 8.5 mm round silicone mould with a depth of ~2 mm, 3) The ample is allowed to cool and then is removed from the mould and placed between the preheated (100° C.) plates of the StressTech rheometer with a 8 mm upper tool, 4) The upper plate is then lowered to a gap of 1.2 mm and the excess adhesive is trimmed from the lower plate, 5) As the sample is cooled, it contracts (shrinks), and the gap is slowly lowered to the final measurement reading of 1.0 mm, while maintaining a normal force of ~0.5 N, and 6) Once the sample has equilibrated at −50° C. for 5 minutes, the temperature sweep can begin by starting and the software calculates the resulting G', G", Tan Delta and complex viscosity for the sample over the entire temperature range.

The results from the test are reported as follows:

1) Report the sample, gap, and conditions,

2) Plot G', G", Tan Delta, and viscosity versus temperature, and

3) Report key features, such as G' at −50° C. and 25° C., Tg (Tan Delta at maximum), and flow point, where Tan Delta equals 1.0.

Test Method 9: Melt Flow Index (MFI)

This method is designed to determine the relative viscosity of thermoplastic polymers (MFI is related to molecular weight and structure of a polymer) and is similar to ASTM-D 1238-95. The apparatus is a dead-weight piston plastometer consisting of a thermostatically controlled heated steel cylinder with a die at the lower end of a weighted piston operating within the cylinder. Detailed description of individual components can be found in ASTM-D 1238-95.

The following steps are used in the test procedure (manual operation with condition 190/5):

1) Check die bore diameter with appropriately sized go/no-go gauges prior to testing. Die is tested at 25+/−5° C., 2) Allow the apparatus, including die and piston to equilibrate at 190+/−0.2° C. for 15 minutes prior to testing, 3) Remove the piston and place it on an insulated surface. Charge the cylinder within 1 minute with a weighted portion of the sample according to the expected flow rate, as given in Table 1 of ASTM-D 1238-95, 4) Replace the piston and allow time for the material to begin to melt, normally about 5 to 6 minutes, 5) Add 5 kg weight to piston and purge air along with some material until piston start marks are still 1.5 to 2 cm from the top of the cylinder. Then allow time for piston to fall naturally to the start marks, 6) Start collecting a timed extrudate when the piston start mark reaches the to of the cylinder as long as the total time from the end of the charging step has not exceeded 7 minutes, 7) Simultaneously start the interval timer (set timer according to Table 1 of ASTM-D 1238-95), and make the initial cut-off when the start mark reaches the cylinder, 8) Make the finial cut-off when the time interval is reached. Check the extrudate for air bubbles and discard if any are found, 9) Purge the remainder of the material and clean the apparatus, 10) Upon cooling, record the weight of the extrudate to the nearest 1 mg, 11) Multiply the weight by the appropriate factor from Table 1 of ASTM-D 1238-95 to obtain the flow rate in grams per 10 minutes, and 12) Repeat steps 2 through 11 for at least three good readings. The results from the test are reported as follows:

1) Condition used, and

2) Average of three samples in g/10 min.

Specification of Standard Atmospheres for Conditioning and Testing

This specification defines standard conditions for normal ambient conditioning of materials. This specification is similar to ASTM-E 171-87.

Standard atmosphere for conditioning and testing of materials shall have a temperature of 23° C.+/−2° C. and a relative humidity of 50%+/−5%.

Materials

Renoil 70A is a white oil marketed by Renkert Oil.

Nexbase® 3060 is an isoparaffinic oil marketed by Fortum Oil and Gas. The Nexbase product is an isoparaffinic oil that is described in more detail above.

Vector® 4211 and Vector® 4111 are styrene-isoprene-styrene (SIS) block co-polymers marketed by Dexco Polymers. Both Vector products are linear triblock copolymers with less than 1% diblock content. Vector 4211 has about 30% styrene content while Vector 4111 has about 18% styrene content.

Escorez® 5400 is a partially hydrogenated cycloaliphatic petroleum hydrocarbon resin sold by Exxon Chemical. This resin is useful as a tackifier.

Nyflex® 222B is a hydrotreated naphthenic oil marketed by Nynas.

Europrene SOL T190 is a SIS polymer made by Polymer Europa that has about 16% styrene content and a diblock content of about 25%.

Irganox® 1010 is a hindered phenol based antioxidant marketed by Ciba Specialty Chemicals.

Pioneer T0352 is a technical grade white oil marketed by Hansen and Rosenthal.

WT95 is Wingtack 95 marketed by the Goodyear Chemical Company.

Sylvalite RE100L is a pentaerythritol ester of tall oil rosin marketed by Arizona Chemical.

EXAMPLES 1-6

Comparison of Properties of White Oil and Isoparaffinc Oil Adhesives

Six samples were prepared with the identity and proportion of ingredients indicated in the following table. The ingredients were blended by mechanical stirring in a 200 gram mixer at 100 rpms under nitrogen gas at 350° F. First, the polymer and oil(s) were mixed until uniform (about 40 minutes), then the tackifier resins were added to cool the sample and mixed until homogeneous (over 30 minutes). Total mixing time was under 90 minutes. Air was later removed by heating at 300° F. under vacuum.

| Material | Description | Example 1 | Example 2 | Example 3 | Example 4 | Example 5 | Example 6 |
| --- | --- | --- | --- | --- | --- | --- | --- |
| Sol T190 | SIS BCP | 0 | 28 | 28 | 28 | 0 | 0 |
| Nexbase 3060 | Isoparaffinic oil | 0 | 0 | 5 | 10 | 15 | 20 |
| Nyflex 222B | Hydrotreated naphthenic Oil | 20 | 0 | 15 | 10 | 5 | 0 |
| Irganox 1010 | Hindered phenolic antioxidant | 0.5 | 0.5 | 0.5 | 0.5 | 0.5 | 0.5 |
| Pioneer T0352 | Technical grade white oil | 0 | 20 | 0 | 0 | 0 | 0 |
| WT 95 | C5 resin | 15 | 15 | 15 | 15 | 15 | 15 |
| Sylv RE100L | Pentaerythritol ester of tall oil rosin | 36.5 | 36.5 | 36.5 | 36.5 | 36.5 | 36.5 |

Examples 1 to 6 were tested by methods described herein. The test results are presented in the following table.

| Property | Example 1 | Example 2 | Example 3 | Example 4 | Example 5 | Example 6 |
| --- | --- | --- | --- | --- | --- | --- |
| Viscosity (mPas) @ | | | | | | |
| 121° C. | 27,050 | 22,000 | 29,500 | 26,000 | 28,650 | 23,800 |
| 135° C. | 13,400 | 11,500 | 14,400 | 13,400 | 15,250 | 10,650 |
| 149° C. | 7,650 | 6,600 | 7,825 | 7,600 | 7,650 | 6,350 |
| 163° C. | 4,787 | 4,200 | 4,800 | 4,712 | 4,637 | 4,750 |
| 177° C. | 3,188 | 2,520 | 2,645 | 3,012 | 2,975 | 2,920 |
| RBSP (° C.) | 81 | 84 | 84 | 85 | 85 | 87 |
| Staining (7 days @ 65° C.) | Slight | Moderate | Slight | Very slight | None (best) | Minimal (second best) |
| Adhesion to Corrugated @ −45° C. | Poor <10% FT | Poor 10% FT | Poor 10% FT | Good 50% FT | Excellent 100% FT | Very Good 90% FT |
| Adhesion to PE Film @ −45° C. | Poor | Fair | Fair | Good | Excellent | Very Good |
| Tg (° C.) | 6 | −1 | 1 | −2 | −8 | −18 |
| G' @ −50° C. (MPa) | 246 | 7 | 11.7 | 462 | 6.63 | 1.53 |
| G' @ 25° C. (kPa) | 60.7 | 70.2 | 61.2 | 72.0 | 66.3 | 62.3 |
| Peak Tan Delta | 3.14 | 3.31 | 3.19 | 3.44 | 3.08 | 2.83 |
| Flow Point Tan = 1.0 (° C.) | 83.5 | 81.8 | 80 | 84.1 | 86.3 | 87 |
| 180° SS Peel (PLI) PSTC 1 | 5.7* | 5.8* | 5.1* | 4.9 | 4.3 | 4.1 |

-continued

| Property | Example 1 | Example 2 | Example 3 | Example 4 | Example 5 | Example 6 |
|---|---|---|---|---|---|---|
| Viscosity (mPas) @ | | | | | | |
| Loop Tack (PLI) PSTC 7 | 5.5 | 5.9 | 6.2 | 5.1 | 4.9 | 4.4 |
| SAFT (° C.) | 68 | 66 | 70 | 70 | 72 | 73 |

*adhesive transfer to SS plate.

EXAMPLES 7-11

Comparison of Properties of White Oil and Isoparaffinc Oil Adhesives

Examples 7-10 were prepared in a manner similar to Examples 1-6 but using the ingredients and proportions indicated by the following table. Example 11 is an adhesive product from Bostik-Findley taken from the market and is intended to represent the current state of the art.

| Material | Description | Example 7 | Example 8 | Example 9 | Example 10 | Example 11 Findley H-2669 |
|---|---|---|---|---|---|---|
| Pioneer T0352 | White oil | 0 | 24.0 | 0 | 0 | XX |
| Nyflex 222B | Hydro naphthenic oil | 25.0 | 0 | 12.0 | 0 | XX |
| Nexbase 3060 | Isoparaffinic oil | 0 | 0 | 10.0 | 23.0 | XX |
| Irganox 1010 | Phenolic antioxidant | 0.5 | 0.5 | 0.5 | 0.5 | XX |
| Vector 4211 | SIS | 7.0 | 10.0 | 10.0 | 10.0 | XX |
| Vector 4111 | SIS | 12.0 | 10.0 | 12.0 | 12.0 | XX |
| Esc. 5400 | Hydrocarbon CS resin | 55.5 | 55.5 | 54.5 | 54.5 | XX |

XX - Components of commercial material are not known.

Examples 7 to 11 were tested by methods described herein. The test results are presented in the following table.

| Property | Example 7 | Example 8 | Example 9 | Example 10 | Example 11 |
|---|---|---|---|---|---|
| Viscosity @ 121° C. | 10,000 | 12,500 | 14,200 | 15,300 | 12,750 |
| Viscosity @ 135° C. | 4,950 | 5,000 | 6,350 | 5,950 | 5,150 |
| Viscosity @ 149° C. | 2,900 | 2,600 | 3,300 | 3,070 | 2,700 |
| Viscosity @ 163° C. | 1,760 | 1,620 | 2,100 | 1,890 | 1,625 |
| Viscosity @ 177° C. | 1,150 | 1,060 | 1,400 | 1,270 | 1,100 |
| RBSP ° C. (° F.) | 82.2 (180) | 89.4 (193) | 87.7 (190) | 91.1 (196) | 83.3 (182) |
| Tg (° C.) | 13 | 3.8 | 7.9 | −20.5 | 15.4 |
| G' @ −50° C. (MPa) | 314 | 0.79 | 448 | 0.28 | 172 |
| G' @ 25° C. (kPa) | 44.9 | 38.5 | 70.0 | 31.9 | 70.3 |
| Peak Tan Delta | 4.49 | 4.04 | 4.16 | 3.03 | 3.81 |
| Flow Point Tan = 1.0 (° C.) | 87.9 | 92.9 | 95.35 | 90.3 | 88.15 |

Peel test results are reported in the following table.

| Product | 20 gsm† coating | 25 gsm coating |
|---|---|---|
| Example 7 | 4.32 +/− 0.20* | 5.71 +/− 0.35* |
| Example 8 | 3.27 +/− 0.16 | 4.37 +/− 0.12 |
| Example 9 | 3.33 +/− 0.13 | 4.25 +/− 0.08 |
| Example 10 | 1.62 +/− 0.15 | 2.07 +/− 0.11 |
| Example 11 | 4.6 +/− 0.21* | 6.03 +/− 0.41* |

*adhesive transferred to SS, not tested for 24 hour aging
†gsm is grams per square meter The results for 24 hour aging peel tests are reported in the following table.

| Product | 20 gsm coating | 25 gsm coating |
|---|---|---|
| Example 8 | 2.93 +/− 0.08 | 4.05 +/− 0.11 |
| Example 9 | 3.13 +/− 0.09 | 3.91 +/− 0.12 |
| Example 10 | 1.50 +/− 0.03 | 2.07 +/− 0.12 |

All patents, patent applications, and other publications that appear in this application are incorporated herein in their entirety.

What is claimed:

1. A hot melt pressure sensitive adhesive comprising:
    (a) about 10 to about 50% by weight of at least one polymer;
    (b) about 5 to about 50% by weight of isoparaffinic oil having a glass transition temperature at or below about −75° C. for amorphous components in said isoparaffinic oil and wherein a carbon-13 nmr spectra of said isoparaffinic oil shows greater than 95 molar percent aliphatic carbon atoms; and
    (c) about 30 to about 65% by weight of at least one tackifying resin.

2. The hot melt pressure sensitive adhesive of claim 1 wherein said isoparaffinic oil has a glass transition temperature at or below about −80° C. for amorphous components in said isoparaffinic oil.

3. The hot melt pressure sensitive adhesive of claim 1 wherein said isoparaffinic oil has a weight average molecular weight of about 390 to about 470.

4. The hot melt pressure sensitive adhesive of claim 1 wherein a carbon-13 nmr spectra of said isoparaffinic oil shows substantially all aliphatic carbon atoms.

5. The hot melt pressure sensitive adhesive of claim 1 wherein said isoparaffinic oil has:
    a glass transition temperature at or below about −75° C. for amorphous components in said isoparaffinic oil;
    a weight average molecular weight of about 390 to 470; and
    a carbon-13 nmr spectra of said isoparaffinic oil shows substantially all aliphatic carbon atoms.

6. The hot melt pressure sensitive adhesive of claim 5 wherein said glass transition temperature is at or below about −80° C. for amorphous components in said isoparaffinic oil.

7. The hot melt pressure sensitive adhesive of claim 1 further comprising up to about 2.0% by weight of at least one stabilizer.

8. The hot melt pressure sensitive adhesive of claim 7 further comprising up to about 10% by weight of at least one filler or wax.

9. The hot melt pressure sensitive adhesive of claim 1 additionally comprising at least one additional oil, said oil being a naphthenic oil, a paraffinic oil, a phthalate or adipate ester, an oligomer of polypropylene, a polybutene, a polyisoprene, a hydrogenated polyisoprene or polybutadiene, a benzoate ester, a vegetable oil or an animal oil.

10. The hot melt pressure sensitive adhesive of claim 8 wherein said wax is a paraffin wax, a microcrystalline wax, a Fischer-Tropsch wax, a polyethylene wax, an ethylene vinyl acetate wax, an oxidized polyethylene wax, a hydrogenated castor oil wax, or mixtures thereof.

11. The hot melt pressure sensitive adhesive of claim 1 wherein said isoparaffinic oil has a Cp value of greater than about 75%, a flash point of greater than 240° C., and a pour point of less than about −15° C.

12. The hot melt pressure sensitive adhesive of claim 1 wherein said tackifying resin comprises at least one of aliphatic petroleum resins or the hydrogenated derivatives thereof, aromatic petroleum resins or the hydrogenated derivatives thereof, aliphatic/aromatic petroleum resins or the hydrogenated derivatives thereof, hydrocarbon resins, styrene resins, alpha-methyl styrene resins, polyterpene resins, copolymers and terpolymers of natural terpene resins, pentaerythritol esters of wood, gum, and tall-oil rosins, glycerol esters of wood, gum, and tall-oil rosins, or mixed esters of rosins.

13. The hot melt pressure sensitive adhesive of claim 7 wherein the stabilizer is an antioxidant.

14. The hot melt pressure sensitive adhesive of claim 13 wherein the antioxidant is a hindered phenol or a phosphite.

15. The hot melt pressure sensitive adhesive of claim 1 wherein said isoparaffinic oil has a Chemical Abstracts number of 72623-87-1.

16. A hot melt construction adhesive comprising:
  (a) about 5 to about 20% by weight of a linear styrene-butadiene A-B-A-B-A multi-block copolymer containing at least about 25 weight percent styrene;
  (b) about 5 to about 20% by weight of a linear styrene-isoprene A-B-A tri-block copolymer containing at least about 25 percent by weight of styrene;
  (c) about 40 to about 65% by weight of at least one tackifying resin;
  (d) about 10 to about 30% by weight of isoparaffinic oil having a glass transition temperature at or below about −75° C. for amorphous components in said isoparaffinic oil and wherein a carbon-13 nmr spectra of said isoparaffinic oil shows greater than 95 molar percent aliphatic carbon atoms;
  (e) up to about 10% by weight of at least one wax; and
  (f) up to about 2.0% by weight of at least one stabilizer;
  said adhesive having a viscosity no greater than about 6,000 mPa·s at about 140° C., a shear adhesion failure temperature of at least about 65° C., and a static shear time to failure of no less than about 25 hours at about 23° C.

* * * * *